(12) United States Patent
Douglas et al.

(10) Patent No.: US 9,541,298 B2
(45) Date of Patent: Jan. 10, 2017

(54) ECONOMIZER HAVING SOURCE-SPECIFIC DAMPER BLADE ASSEMBLIES AND HEATING, VENTILATION AND AIR CONDITIONING UNIT EMPLOYING THE SAME

(75) Inventors: Jonathan Douglas, Lewisville, TX (US); Erroll Eaton, McKinney, TX (US)

(73) Assignee: Lennox Industries Inc., Richardson, TX (US)

(*) Notice: Subject to any disclaimer, the term of this patent is extended or adjusted under 35 U.S.C. 154(b) by 463 days.

(21) Appl. No.: 13/332,740

(22) Filed: Dec. 21, 2011

(65) Prior Publication Data

US 2013/0040549 A1    Feb. 14, 2013

Related U.S. Application Data

(60) Provisional application No. 61/523,005, filed on Aug. 12, 2011.

(51) Int. Cl.
| | |
|---|---|
| F24F 7/00 | (2006.01) |
| F24F 13/00 | (2006.01) |
| F24F 11/00 | (2006.01) |
| F24F 13/14 | (2006.01) |
| F24F 7/06 | (2006.01) |

(52) U.S. Cl.
CPC ............. *F24F 11/0001* (2013.01); *F24F 7/06* (2013.01); *F24F 13/1413* (2013.01); *F24F 2011/0075* (2013.01); *F24F 2013/1473* (2013.01); *Y02B 30/767* (2013.01)

(58) Field of Classification Search
CPC ................................................. F24F 11/0001
USPC ................................................. 454/237, 239
See application file for complete search history.

(56) References Cited

U.S. PATENT DOCUMENTS

| | | | | |
|---|---|---|---|---|
| 3,049,985 | A * | 8/1962 | Klingberg | 49/77.1 |
| 3,261,373 | A * | 7/1966 | Ridenour | 137/601.11 |
| 3,267,962 | A * | 8/1966 | Josephson et al. | 137/601.11 |
| 4,100,763 | A * | 7/1978 | Brody | 62/238.6 |
| 5,564,626 | A * | 10/1996 | Kettler et al. | 236/49.3 |
| 5,590,830 | A * | 1/1997 | Kettler et al. | 236/49.3 |
| 5,707,005 | A * | 1/1998 | Kettler et al. | 236/49.3 |
| 5,730,653 | A * | 3/1998 | Van Becelaere | 454/369 |
| 5,842,919 | A * | 12/1998 | Lyons | F24F 13/15 137/601.11 |

(Continued)

OTHER PUBLICATIONS

Ruskin, Face and Bypass Mixing dampers, www.ruskin.com/doc/780 or www.ruskin.com/model/FBP, 2010, Retrieved Jan. 14, 2014.*

(Continued)

*Primary Examiner* — Steven B McAllister
*Assistant Examiner* — Jonathan Cotov
(74) *Attorney, Agent, or Firm* — Winstead PC

(57) ABSTRACT

An economizer having a first air inlet, a second air inlet and an air outlet, a method of operating an economizer and a heating, ventilation and air conditioning (HVAC) system employing the economizer. In one embodiment, the economizer includes: (1) a first damper blade assembly in fluid communication with the first air inlet and the air outlet and having a first plurality of damper blades configured to move in parallel and (2) a second damper blade assembly in fluid communication with the second air inlet and the air outlet and having a second plurality of damper blades configured to move in opposition.

9 Claims, 4 Drawing Sheets

(56) References Cited

U.S. PATENT DOCUMENTS

| | | | |
|---|---|---|---|
| 7,089,958 B2* | 8/2006 | Schlosser et al. | 137/601.11 |
| 7,150,314 B2* | 12/2006 | Moffitt | 165/249 |
| 8,500,528 B2* | 8/2013 | Leonhard et al. | 454/336 |
| 2003/0181158 A1* | 9/2003 | Schell | F24F 3/0442 |
| | | | 454/229 |
| 2008/0160901 A1* | 7/2008 | Stanimirovic | 454/239 |
| 2013/0186118 A1* | 7/2013 | Ohs | 62/94 |

OTHER PUBLICATIONS

Ruskin, Face and Bypass Mixing dmapers, Www.ruskin.com/doc/780 or www.ruskin.com/model/fbp, 2010 retrieved Jan. 14, 2014.*
Honeywell, Damper Selection and Sizing, www.buildingcontrolworkbench.com/BCWinfo/Graybook/Gdsstoc.htm, 2007, Retrieved Jan. 14, 2014.*
Ruskin, Face and Bypass Mixing dmapers, Www.ruskin.com/doc/780 orwww.ruskin.com/model/fbp, 2010 retrieved Jan. 14, 2014.*
Honeywell, Damper Selection and Sizing, www.buildingcontrolworkbench.com/BWinfo/Graybook/Gdsstoc.htm, 2007, Retrieved Jan. 14, 2014.*
Ruskin, Face and Bypass Mixing Dampers, www.ruskin.com/doc/780 or www.ruskin.com/model/fbp, 2010 retrieved Jan. 14, 2014.*
Ruskin, industrial and tunner ventilation dampers, http://www.ruskin.com/catalog/default.aspx?folder=2, Feb. 9, 2010, retrieved Feb. 11, 2014.*

* cited by examiner

ECONOMIZER HAVING SOURCE-SPECIFIC DAMPER BLADE ASSEMBLIES AND HEATING, VENTILATION AND AIR CONDITIONING UNIT EMPLOYING THE SAME

CROSS-REFERENCE TO RELATED APPLICATION

This application claims the benefit of U.S. Provisional Application Ser. No. 61/523,005, filed by Douglas on Aug. 12, 2011, entitled "Economizer for Precise Ventilation Control," commonly assigned with this application and incorporated herein by reference.

TECHNICAL FIELD

This application is directed, in general, to heating, ventilation and air conditioning (HVAC) systems and, more specifically, to an economizer having improved air blending characteristics.

BACKGROUND

An air-side economizer is an accessory to an HVAC system that enables it to run more economically. Economizers proportionally blend return air drawn from the indoor space of a building and outdoor air drawn from outside the building to make the overall enthalpy of the blended air as low as reasonably possible and to comply with building ventilation codes that exist in virtually every jurisdiction. Economizers have two damper assemblies: a return air damper for the return air and an outdoor air damper for the outdoor air. When the return air damper is fully closed, the outdoor air damper is fully open. As the return air damper is opened, the outdoor air damper is closed. When the return air damper is fully open, the outdoor air damper is fully closed. As the outdoor air damper is opened, the return air damper is closed.

Each damper is an assembly having a plurality of elongated damper blades that rotate about their major axis as the damper is opened and closed. Conventional economizers come in two varieties: those in which all of the damper blades of both damper assemblies move in parallel and those in which adjacent damper blades of both damper assemblies move in opposition. Conventional economizers work reasonably well and are becoming evermore popular as energy costs rise and customers look for ways to decrease costs and help the environment.

SUMMARY

One aspect provides an economizer having a first air inlet, a second air inlet and an air outlet. In one embodiment, the economizer includes: (1) a first damper blade assembly in fluid communication with the first air inlet and the air outlet and having a first plurality of damper blades configured to move in parallel and (2) a second damper blade assembly in fluid communication with the second air inlet and the air outlet and having a second plurality of damper blades configured to move in opposition.

Another aspect provides a method of operating an economizer having source-specific damper blade assemblies. In one embodiment, the method includes: (1) determining an enthalpy of first and second air sources, (2) determining a blend of the first and second air sources having an optimal enthalpy, (3) determining damper settings needed to achieve the blend, (4) moving a first plurality of damper blades in parallel in accordance with the damper settings and (5) moving a second plurality of damper blades in opposition in accordance with the damper settings.

Yet another aspect provides an HVAC system. In one embodiment, the HVAC system includes an economizer having a return air inlet, an outdoor air inlet and a blended air outlet. In one embodiment, the economizer includes: (1) a frame, (2) a first damper blade assembly mounted in the frame, in fluid communication with the return air inlet and the blended air outlet and having a first plurality of damper blades configured to move in parallel and (3) a second damper blade assembly mounted in the frame, in fluid communication with the outdoor air inlet and the blended air outlet and having a second plurality of damper blades configured to move in opposition.

BRIEF DESCRIPTION

Reference is now made to the following descriptions taken in conjunction with the accompanying drawings, in which.

DETAILED DESCRIPTION

As stated above, conventional economizers come in two varieties: those in which all of the damper blades of both damper assemblies move in parallel and those in which adjacent damper blades of both damper assemblies move in opposition. In other words, conventional economizers employ either damper blades moving in parallel or damper blades moving in opposition.

It has been discovered herein that different aerodynamic effects result from damper blades moving in parallel than from damper blades moving in opposition. Damper blades moving in parallel exhibit a lower pressure drop than damper blades moving in opposition. However, damper blades moving in opposition provide more precise volume control than damper blades moving in parallel. Therefore, the conventional economizers either opted for either a lower pressure drop for both the return air and the outdoor air or more precise volume control for both the return air and the outdoor air.

It has also been discovered herein that a reduced pressure drop is more important for return air than it is for outdoor air and that the precision of volume control is more important for outdoor air than it is for return air. To elaborate, it is generally important to keep the pressure drop through an HVAC system as low as reasonably possible to keep its efficiency as high as reasonably possible. Being adjunct to the HVAC system, the economizer is no exception. However, it is also important to ensure that the proper amount of outside air is admitted into the HVAC system. Underventilating violates applicable building ventilation codes. Overventilating reduces HVAC efficiency. Both of these considerations prevail throughout the full range of motion of the damper blades—from fully closed to fully open and all positions in between.

Accordingly, introduced herein are various embodiments of a novel economizer having "source-specific" damper blade assemblies, that is, damper blade assemblies that differ in terms of, the manner in which they move depending upon whether they are damping return air or outdoor air. The various embodiments introduced herein include a damper blade assembly that is "source-specific" for return air in that its damper blades move in parallel and further include a damper blade assembly that is "source-specific" for outdoor air in that its damper blades move in opposition.

Also introduced herein are various embodiments of a novel method of operating an economizer having source-specific damper blade assemblies and an HVAC system that includes the novel economizer.

Figure 1:
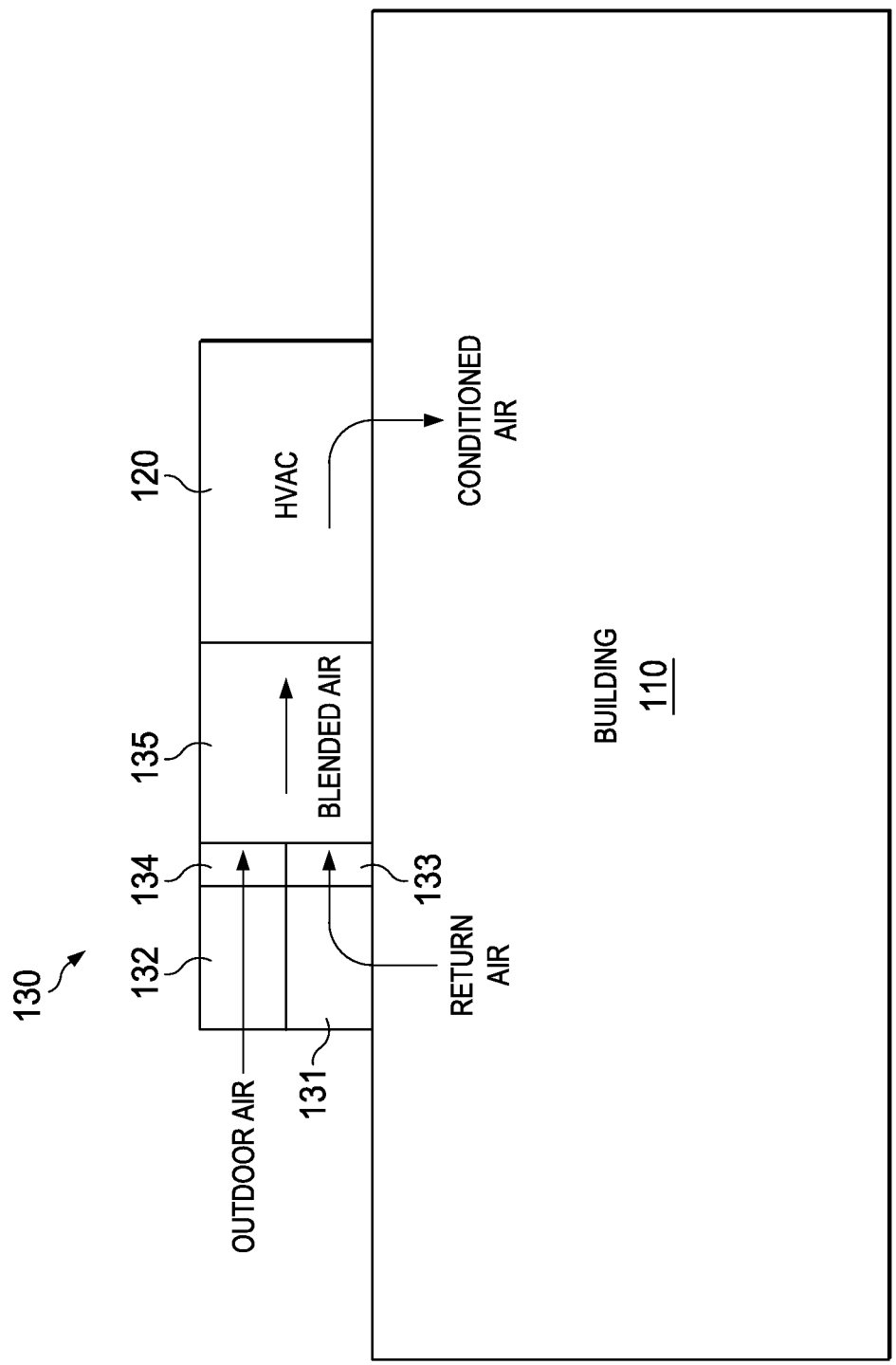
FIG. 1 is a high-level schematic diagram of one embodiment of an HVAC system having an economizer.

FIG. 1 is a high-level schematic diagram of one embodiment of an HVAC system having an economizer. A building 110 has an HVAC system 120 configured to condition the air in the building 110. In the illustrated embodiment, the HVAC system 120 is a rooftop unit (RTU). However, the HVAC system 110 may be of any conventional or later-developed configuration.

The HVAC system 120 has an economizer 130. The economizer 130 is coupled to the HVAC system 120 and is configured to receive return air drawn from the building 110 into a return air inlet 131 thereof. The economizer 130 is further configured to receive outdoor air drawn from outside the building 110 into an outside air inlet 132 thereof. In the illustrated embodiment, the return air inlet 131 and the outdoor air inlet 132 are substantially separate; they are not in substantial fluid communication with one another when the economizer 130 is in operation.

The economizer 130 further includes a return air damper assembly 133 in fluid communication with the return air inlet 131. The economizer 134 still further includes an outdoor air damper assembly 134 in fluid communication with the outdoor air. When the return air damper assembly 133 is fully closed, the outdoor air damper assembly 134 is fully open. As the return air damper assembly 133 is opened, the outdoor air damper assembly 134 is closed. When the return air damper assembly 133 is fully open, the outdoor air damper assembly 134 is fully closed. As the outdoor air damper assembly 134 is opened, the return air damper assembly 133 is closed.

Return air and outdoor air passing respectively through the return air damper assembly 133 and the outdoor air damper assembly 134 enter a common outlet 135 where they are blended and thereafter enter the HVAC system 120 for conditioning. In the illustrated embodiment, the common outlet 135 is in substantially unidirectional fluid communication with the return air inlet 131 and the outdoor air inlet 132 when the economizer 130 is in operation. Due to suction from the HVAC system 120, air flows from the return air inlet 131 and the outdoor air inlet 132 into the common outlet 135, but not generally the opposite way.

Figure 2:
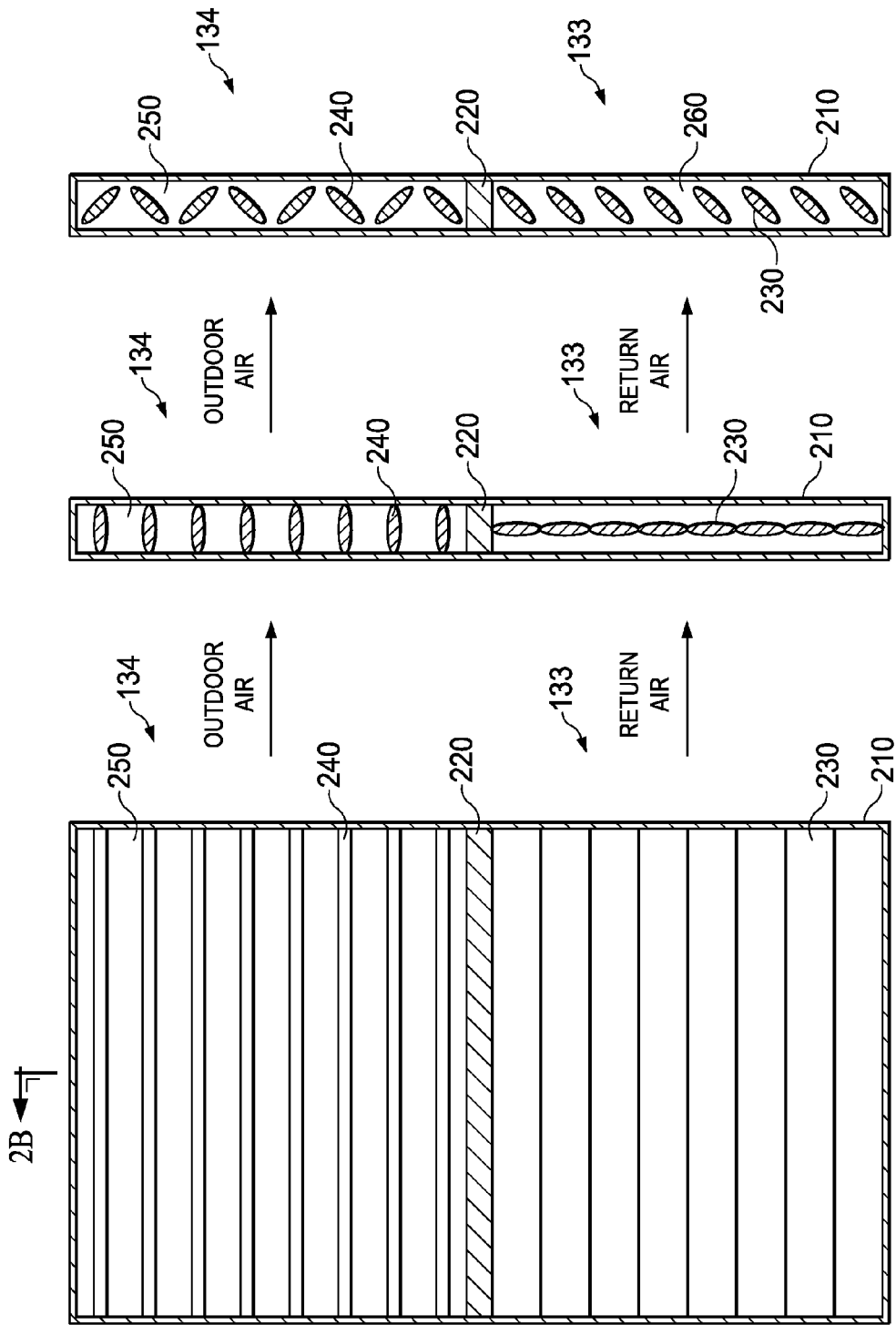
FIG. 2A is a front elevational view of one embodiment of source-specific damper blade assemblies of an economizer.
FIG. 2B is a right side elevational, sectional view of the source-specific damper blade assemblies of FIG. 2A, taken along lines 2B-2B, in a first example configuration blade position in which a first damper blade assembly is in a fully closed position and a second damper blade assembly is in a fully open position.
FIG. 2C is a right side elevational, sectional view of the source-specific damper blade assemblies of FIG. 2A, taken along lines 2B-2B, in a second example configuration in which both the first and second damper blade assemblies are in partially open positions.

FIG. 2A is a front elevational view of one embodiment of source-specific damper blade assemblies of an economizer having a frame 210 and an elongated member 220 configured, among other things to allow multiple source-specific damper blade assemblies to be mounted in the frame 210. The economizer of FIG. 2A may be the economizer 130 of FIG. 1. The elongated member 220 may be advantageously coupled to other structures and therefore assist in substantially separating air inlets, perhaps the return air inlet 131 and the outdoor air inlet 132 of FIG. 1, from one another.

The embodiment of FIG. 2A includes a first damper blade assembly 133 and a second damper blade assembly 134. The first damper blade assembly 133 includes a first plurality of damper blades, one of which being referenced as 230. In the embodiment of FIG. 2A, each of the first plurality of damper blades 230 is elongated and rotatably coupled to the frame 210 at ends thereof such that the each of the first plurality of damper blades 230 can rotate about a major axis thereof between a fully open position and a fully closed position. Each of the first plurality of damper blades 230 is shown in FIG. 2A in a fully closed position in which the first plurality of damper blades 230 cooperate to allow minimal air flow through the first damper blade assembly 133.

The second damper blade assembly 134 includes a second plurality of damper blades, one of which being referenced as 240. In the embodiment of FIG. 2A, each of the second plurality of damper blades 240 is elongated and rotatably coupled to the frame 210 at ends thereof such that the each of the second plurality of damper blades 240 can rotate about a major axis thereof between a fully open position and a fully closed position. Each of the second plurality of damper blades 240 is shown in FIG. 2A in a fully open position in which the second plurality of damper blades 240 are feathered to allow maximal air flow through interstices 250 separating the second plurality of damper blades 240 of the second damper blade assembly 134.

As stated above, the economizer may be the economizer 130 of FIG. 1. As such, the first damper blade assembly 133 may be the return air damper assembly 133, and the second damper blade assembly 134 may be the outdoor air damper assembly 134. However, those skilled in the pertinent art will realize that the first and second damper blade assemblies 133, 134 may be specific to other sources, such as conditioned air and exhaust air. Further, those skilled in the pertinent art will realize that the first and second damper blade assemblies 133, 134 may be employed, perhaps with further damper blade assemblies, in an apparatus other than an economizer.

FIG. 2B is a right side elevational, sectional view of the source-specific damper blade assemblies of FIG. 2A, taken along lines 2B-2B. The source-specific damper blade assemblies are in a first example configuration blade position in which the first damper blade assembly 133 is in a fully closed position and the second damper blade assembly 134 is in a fully open position. If the first damper blade assembly 133 is the return air damper assembly 133 and the second damper blade assembly 134 is the outdoor air damper assembly 134, the configuration of FIG. 2B represents a configuration called "free cooling," in which outdoor air is more efficient to condition than return air. As in FIG. 2A, each of the first plurality of damper blades 230 is shown in FIG. 2B in a fully closed position in which the first plurality of damper blades 230 cooperate to allow minimal air flow through the first damper blade assembly 133. Further as in FIG. 2A, each of the second plurality of damper blades 240 is shown in FIG. 2B in a fully open position in which the second plurality of damper blades 240 are feathered to allow maximal air flow through the interstices 250 separating the second plurality of damper blades 240 of the second damper blade assembly 134.

FIG. 2C is a right side elevational, sectional view of the source-specific damper blade assemblies of FIG. 2A, taken along lines 2B-2B. The source-specific damper blade assemblies are in a second example configuration in which both the first and second damper blade assemblies 133, 134 are in partially open positions. This partially open configuration is typical when building ventilation codes require at least some outside air be admitted into the building—the objective becomes one of meeting the code while maintaining HVAC efficiency as high as possible.

Each of the first plurality of damper blades 230 is shown in FIG. 2B in a partially open position in which the first plurality of damper blades 230 cooperate to allow less-than-maximal (i.e., more than minimal) air flow through interstices 260 separating the first plurality of damper blades 230 of the first damper blade assembly 133. Each of the second plurality of damper blades 240 is likewise shown in FIG. 2B in a partially open position in which the second plurality of damper blades 240 cooperate to allow less-than-maximal (i.e., more than minimal) air flow through the interstices 250 separating the second plurality of damper blades 240 of the second damper blade assembly 134. In the embodiment of FIG. 2C, the elongated member 220 extends from the frame 210 in a direction that allows it to assist in substantially separating air inlets (e.g., the return air inlet 131 and the outdoor air inlet 132 of FIG. 1). FIG. 2C shows particularly well the fact that the first plurality of damper blades 230 move in parallel and the second plurality of damper blades 240 move in opposition.

Figure 3:
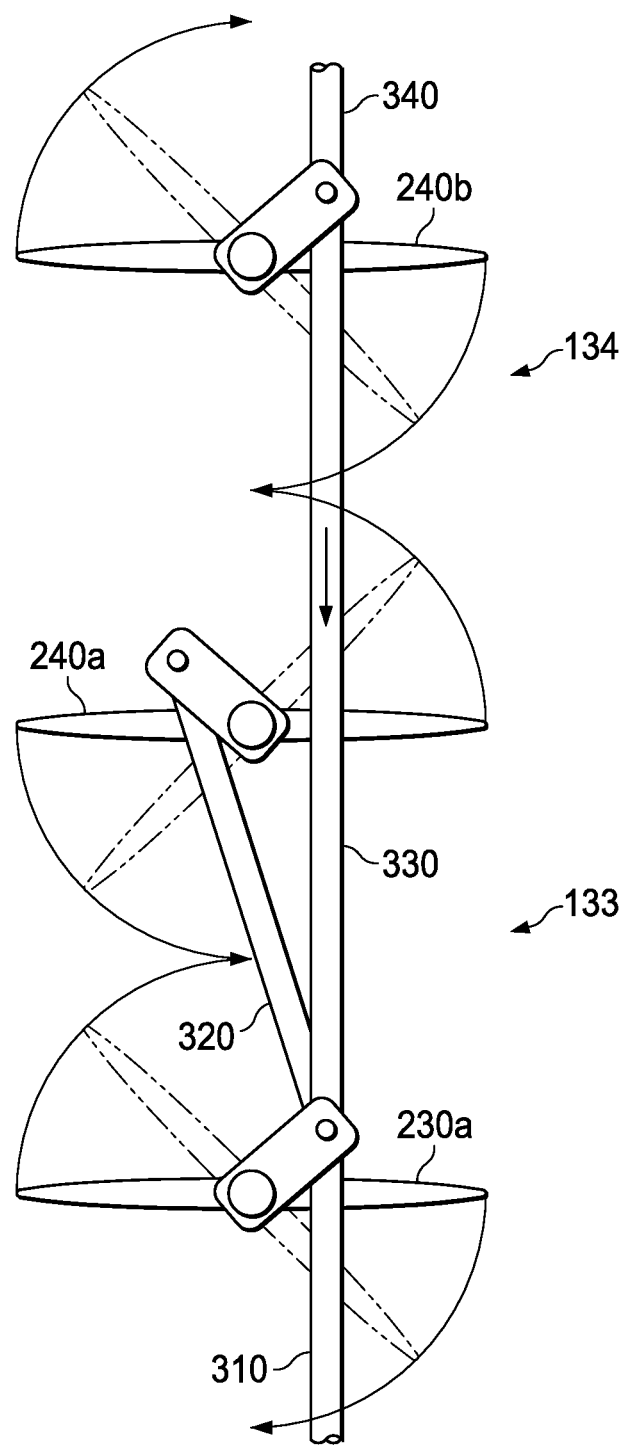
FIG. 3 is a partial right side elevational view of one embodiment of the source-specific damper blade assemblies including a linkage that may be employed to interconnect damper blades thereof.

FIG. 3 is a partial right side elevational view of one embodiment of the source-specific damper blade assemblies including a linkage that may be employed to interconnect damper blades thereof. FIG. 3 shows the first and second damper blade assemblies 133, 134. One damper blade of the first plurality of damper blades (230 of FIGS. 2A, 2B, 2C) is referenced as 230a. Two damper blades of the second plurality of damper blades (240 of FIGS. 2A, 2B, 2C) are referenced as 240a, 240b. The linkage of FIG. 3, which is only one embodiment by which the blades of the first and second damper blade assemblies 133, 134 may be interconnected, includes a plurality of links rotatably coupled to the damper blades (i.e., one link 310 couples an unshown damper blade adjacent the damper blade 230a, another link 320 couples the damper blade 230a to the damper blade 240a, yet another link 330 couples the damper blade 230a to the damper blade 240b, and still another link 340 couples the damper blade 240b to an unshown damper blade adjacent the damper blade 240b). When, for example, the link 310 is urged downward as shown, the damper blade 230a rotates clockwise as arrows indicate. The downward urging of the link 310 also causes the link 320 to be urged downward, and the damper blade 240a rotates counterclockwise as arrows indicate. The downward urging of the link 310 further causes the link 330 to be urged downward, and the damper blade 240b rotates clockwise as arrows indicate. The link 340 is also urged downward as a result.

As stated above, the linkage of FIG. 3 is but one embodiment that may be employed to interconnect damper blades thereof. Gears coupled to the ends of the first and second pluralities of damper blades 230, 240 may mesh with each other, intermediate gears a rack or any combination of these to effect parallel movement of the first plurality of damper blades 230 and opposing movement of the second plurality of damper blades 240.

Figure 4:
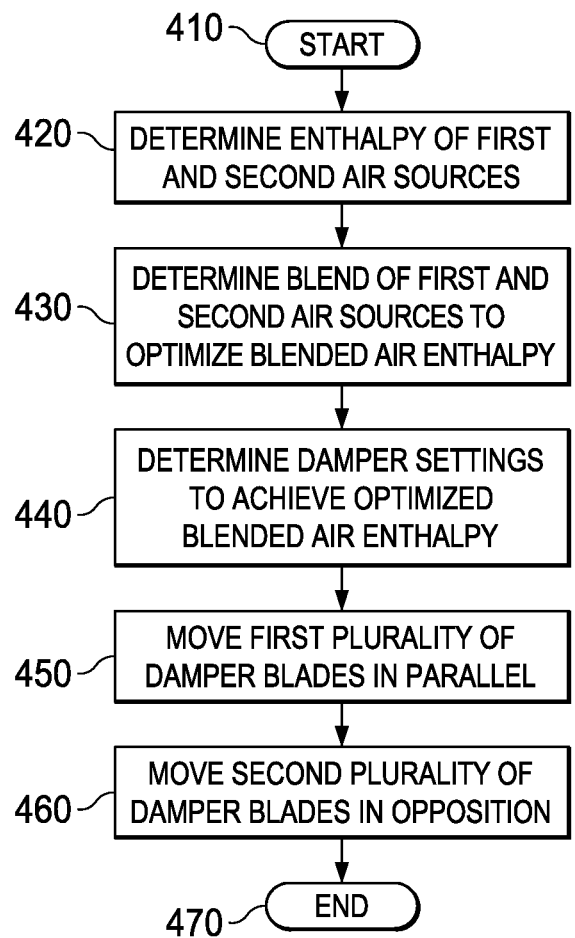
FIG. 4 is a flow diagram of one embodiment of a method of operating an economizer having source-specific damper blade assemblies.

FIG. 4 is a flow diagram of one embodiment of a method of operating an economizer having source-specific damper blade assemblies. The method begins in a start step 410. In a step 420, the enthalpy of first and second air sources is determined. In one embodiment, the first air source is return air drawn from the indoor space of a building. In a related embodiment, the second air source is outdoor air drawn from outside a building. In a step 430, the blend of the first and second air sources having the optimal enthalpy is determined. In one embodiment, the blend is expressed in terms of percentage (e.g., 40% return air and 60% outdoor air). In a step 440, the damper settings needed to achieve the blend of the first and second air sources having the optimal enthalpy is then determined. In a step 450, a first plurality of damper blades is moved in parallel in accordance with the damper settings determined in the step 440. In a step 460, a second plurality of damper blades is moved in opposition in accordance with the damper settings determined in the step 440. The method ends in an end step 470.

Those skilled in the art to which this application relates will appreciate that other and further additions, deletions, substitutions and modifications may be made to the described embodiments.

What is claimed is:

1. An economizer having a first air inlet, a second air inlet, an air outlet and source-specific damper blade assemblies, comprising:
    a first damper blade assembly in fluid communication with said first air inlet and said air outlet and having a first plurality of damper blades configured to move in parallel with each other;
    a second damper blade assembly in fluid communication with said second air inlet and said air outlet and having a second plurality of damper blades, wherein adjacent damper blades of said second plurality of damper blades are configured to move in opposition to each other;
    a frame, wherein said first damper blade assembly and said second damper blade assembly are both mounted in said frame;
    an elongated member configured to separate said first damper blade assembly from said second damper blade assembly in said frame;
    wherein the first and the second damper blade assemblies are interconnected using a plurality of links;
    wherein a first link of the plurality of links is configured to couple a first damper blade of the first plurality of damper blades with a second damper blade of the first plurality of damper blades;
    wherein a second link of the plurality of links is configured to couple the second damper blade of the first plurality of damper blades with a first damper blade of the second plurality of damper blades;
    wherein a third link of the plurality of links is configured to couple the second damper blade of the first plurality of damper blades with a second damper blade of the second plurality of damper blades;
    wherein a fourth link of the plurality of links is configured to couple the second damper blade of the second plurality of damper blades with a third damper blade of the second plurality of damper blades; and
    wherein, during operation of the economizer, the first plurality of damper blades are operable to move in parallel with each other and the second plurality of damper blades are operable to move in opposition to each other at the same time.

2. The economizer as recited in claim 1, wherein said first and second damper blade assemblies are mounted in alignment in said frame.

3. The economizer as recited in claim 2, wherein said first plurality of damper blades are rotatably coupled to said frame to allow said first plurality of damper blades to rotate along a major axis thereof and said second plurality of damper blades are rotatably coupled to said frame to allow said second plurality of damper blades to rotate along a major axis thereof.

4. The economizer as recited in claim 1, wherein said first damper blade assembly is for a return air source and said second damper blade assembly is for an outdoor air source and said elongated member is further configured to assist in substantially separating said first and second air inlets from one another.

5. A heating, ventilation and air conditioning (HVAC) system, comprising:
an economizer having a return air inlet, an outdoor air inlet and a blended air outlet and including:
a frame;
an elongated member;
a first damper blade assembly mounted in said frame, in fluid communication with said return air inlet and said blended air outlet and having a first plurality of damper blades configured to move in parallel with each other;
a second damper blade assembly mounted in said frame, in fluid communication, with said outdoor air inlet and said blended air outlet and having a second plurality of damper blades, wherein adjacent damper blades of said second plurality of damper blades are configured to move in opposition to each other and said return air inlet and said outdoor air inlet receive air from different sources, wherein said elongated member is positioned to separate said first damper blade assembly from said second damper blade assembly in said frame;
wherein the first and the second damper blade assemblies are interconnected using a plurality of links;
wherein a first link of the plurality of links is configured to couple a first damper blade of the first plurality of damper blades with a second damper blade of the first plurality of damper blades;
wherein a second link of the plurality of links is configured to couple the second damper blade of the first plurality of damper blades with a first damper blade of the second plurality of damper blades;
wherein a third link of the plurality of links is configured to couple the second damper blade of the first plurality of damper blades with a second damper blade of the second plurality of damper blades;
wherein a fourth link of the plurality of links is configured to couple the second damper blade of the second plurality of damper blades with a third damper blade of the second plurality of damper blades; and
wherein, during operation of the economizer, the first plurality of damper blades are operable to move in parallel with each other and the second plurality of damper blades are operable to move in opposition to each other at the same time.

6. The HVAC system as recited in claim 5, wherein said first plurality of damper blades are rotatably coupled to said frame to allow said first plurality of damper blades to rotate along a major axis thereof and said second plurality of damper blades are rotatably coupled to said frame to allow said second plurality of damper blades to rotate along a major axis thereof.

7. The HVAC system as recited in claim 5, wherein said elongated member is further configured to assist in substantially separating said return air inlet and said outdoor air inlet from one another.

8. The HVAC system as recited in claim 5, wherein said elongated member is positioned to prevent said return air inlet from being a source for said outdoor damper blade assembly and said second air inlet from being a source for said first damper blade assembly.

9. The economizer as recited in claim 1, wherein said elongated member is configured to prevent said first air inlet from being a source for said second damper blade assembly and said second air inlet from being a source for said first damper blade assembly.

* * * * *